United States Patent [19]

Tonomura

[11] Patent Number: 4,948,161
[45] Date of Patent: Aug. 14, 1990

[54] SUSPENSION SYSTEM FOR A DIRIGIBLE WHEEL OF MOTOR VEHICLE

[75] Inventor: Hiroshi Tonomura, Yokohama, Japan

[73] Assignee: Nissan Motor Co., Ltd., Japan

[21] Appl. No.: 330,805

[22] Filed: Mar. 30, 1989

[30] Foreign Application Priority Data

Apr. 31, 1988 [JP] Japan ................................. 63-79948

[51] Int. Cl.⁵ .............................................. B60G 3/20
[52] U.S. Cl. .................................. 280/675; 280/96.1; 280/691; 280/661
[58] Field of Search ............... 280/691, 690, 771, 668, 280/660, 675, 96.1, 661

[56] References Cited

U.S. PATENT DOCUMENTS

| 4,440,420 | 4/1984 | Miller | 280/691 |
| 4,705,292 | 11/1987 | Hespelt et al. | 280/660 |
| 4,714,270 | 12/1987 | Rumpel | 280/690 |
| 4,744,586 | 5/1988 | Shibahata et al. | 280/691 |
| 4,819,959 | 4/1989 | Inoue et al. | 280/675 |

FOREIGN PATENT DOCUMENTS

| 52-9889 | 3/1977 | Japan . |
| 58-67508 | 4/1983 | Japan . |
| 61-218408 | 9/1986 | Japan . |
| 62-91377 | 4/1987 | Japan . |

Primary Examiner—Richard A. Bertsch
Attorney, Agent, or Firm—Leydig, Voit & Mayer

[57] ABSTRACT

A suspension system of a dirigible wheel for motor vehicles induces a positive tread change upon steering the vehicle. Upper suspension members have axle side mounting portions mounted on a wheel carrier with an axle on which a dirigible wheel is rotatably supported. The axle side mounting portions are disposed on opposite sides of the center of the wheel and a middle portion which is substantially equidistant from the side mounting portions is displaced from the center of the dirigible wheel in the longitudinal direction of the vehicle body.

5 Claims, 5 Drawing Sheets

FIG. 2   FIG. 3   FIG. 4
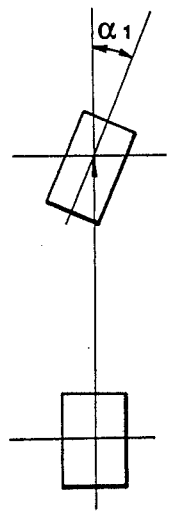 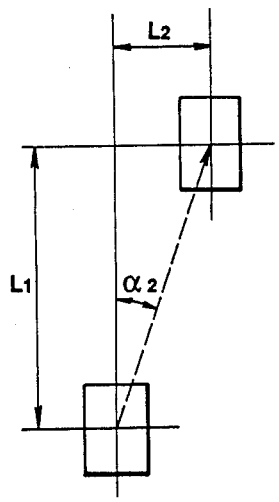 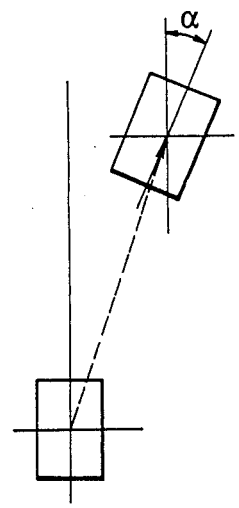
FIG. 5
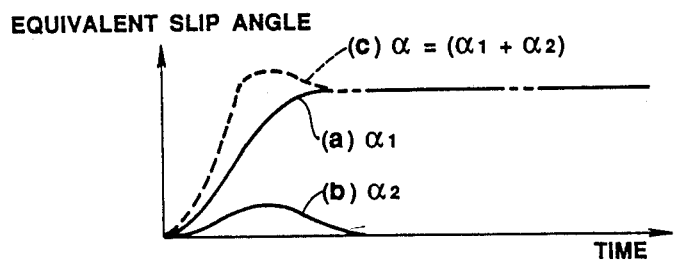
FIG. 6
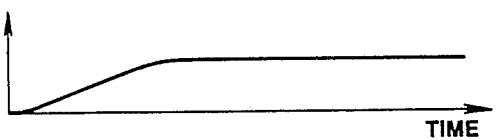

SUSPENSION SYSTEM FOR A DIRIGIBLE WHEEL OF MOTOR VEHICLE

BACKGROUND OF THE INVENTION

1. Field of the Invention

The present invention relates to a suspension system for a dirigible wheel of a motor vehicle.

2. Description of the Prior Art

A suspension system for a dirigible wheel of a motor vehicle is disclosed in U.S. Pat. No. 4,440,420. This suspension system comprises two upper guide links whose bisector subtends an acute angle to the wheel axis as viewed in plan. The axle side mounting points are disposed to the rear of the wheel axis in the driving direction as viewed in plan, thereby to producing a negative camber change in the outer wheel during a turn.

Another suspension system for a dirigible wheel of a motor vehicle is disclosed in examined Japanese patent publication No. 52-9889. This suspension system comprises two independent control arms which are arranged in the upper and lower areas of a wheel carrier and are mounted on the wheel carrier by a ball joint to allow the camber angle to be set so as to provide a desired steering characteristics.

Another suspension system for a dirigible wheel a motor vehicle is disclosed in U.S. Pat. No. 4,705,292 (Hespelt et al.). This suspension system comprises two upper or lower guide links having axle side mounting which are biased laterally with respect to the vehicle body to increase the camber angle during steering vehicle.

However, such known suspension systems do not induce any positive tread change during steering of the vehicle, although they induce a camber angle change. Thus they fail to provide a satisfactory response of the vehicle to manipulation of the steering wheel.

It is therefore an object of the present invention to provide a suspension system for a dirigible wheel of a motor vehicle which induces a positive tread change during steering of the vehicle.

A specific object of the present invention is to provide a suspension system for a dirigible wheel of a motor vehicle which induces a tread change during steering of the vehicle in accordance with the vehicle speed.

SUMMARY OF THE INVENTION

The present invention is a suspension system for a dirigible wheel of a motor vehicle having a vehicle body with a longitudinal axis and a dirigible wheel with a center, comprising:

a wheel carrier with an axle rotatably supporting the dirigible wheel, the wheel carrier having a lower portion and an upper portion;

first means for connecting the lower portion of the wheel carrier with the vehicle body; and second means for connecting the upper portion of wheel carrier with the vehicle body, the second means having a first axle side mounting portion mounted on the upper portion of said wheel carrier and a second axle side mounting portion mounted on the upper portion, the first and second axle side mounting portions of the second means being spaced from one another in the longitudinal direction of the vehicle body with a middle portion substantially equidistant from the axle side mounting portions displaced from the center of the wheel in the longitudinal direction of the vehicle body.

In one of the present invention, the center of the dirigible wheel is displaced forwardly of the middle portion in the longitudinal direction of the vehicle body.

In another form of the present invention, the center of the dirigible wheel is displaced rearwardly of the middle portion in the longitudinal direction of the vehicle body.

BRIEF DESCRIPTION OF THE DRAWINGS

FIGS. 2 to 4 are diagrams explaining slip angle;

FIG. 5 is a diagram showing the transition of the equivalent slip angle;

FIG. 6 is a diagram showing the transition of the input handle steering angle;

DETAILED DESCRIPTION OF THE INVENTION

Figure 1:
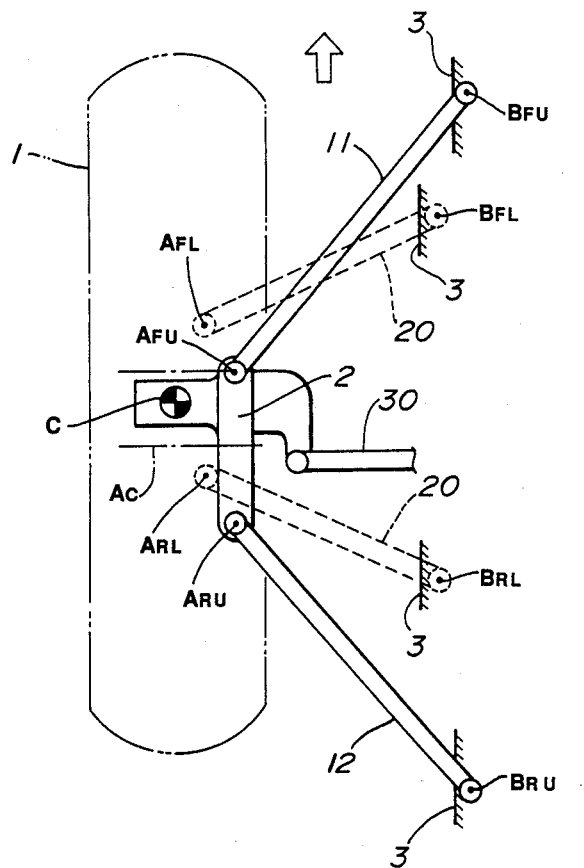
FIG. 1 is a plan view of a first embodiment of a suspension system for a dirigible wheel of a motor vehicle according to the present invention.

Before describing embodiments of the present invention, the meanings of tread change and the requirement for guide link construction will be explained.

Tread change: First, it is to be noted that tread change becomes the equivalent change in toe angle. The big difference between the toe angle change due to tread change and roll steer (toe angle change produced by suspension geometry) or compliance steer (toe angle change produced by elastic deformation of suspension system) is that the former increases in proportion to wheel steering speed and decreases in inverse proportion to vehicle speed while the latter changes approximately in proportion to roll or external force. Further, the toe angle change due to tread change is approximately proportional to the steering speed of a steering wheel for deflection of bushings, etc. Accordingly, on a turned outer side wheel, the toe angle change due to tread change during vehicle steering is expressed by the following formula:

$$\text{equivalent toe angle } \alpha K(\theta/V)$$

wherein K is a constant of tread change (determined by a suspension system), $\theta$ is the steering speed and V a vehicle speed. It is to be noted that, by displacing the ground contacting point of the wheel in the direction to enlarge the tread of the turned outer side wheel during vehicle steering, the toe angle change becomes equivalently greater as the vehicle speed is lower and the steering speed is higher. Additionally, it is obvious that, upon steering the vehicle a medium or low vehicle speed, the equivalent toe angle is large resulting in increased responsiveness of the vehicle, while upon steering the vehicle at a high vehicle speed, the equivalent toe angle becomes small so that high speed stability is obtained.

In FIGS. 2 to 6, the toe angle change due to tread change during vehicle steering is substituted by the equivalent slip angle change. In FIG. 2, $\alpha_1$ (alpha one) denotes the slip angle with vehicle steering but without tread change. Transition of the slip angle $\alpha_1$ (alpha one) at an input steering angle of FIG. 6 is indicated by curve (a) in FIG. 5. In FIG. 3, $\alpha_2$ (alpha two) denotes the slip angle with tread change but without vehicle steering. The frequency of the slip angle $\alpha_2$ (alpha two) produced per predetermined period of time becomes greater as distance $L_1$ (which is proportional to the vehicle speed) decreases and as distance $L_2$ (which is proportional to the wheel steering speed and the constant of tread change increases. Transition of the slip angle $\alpha_2$ (alpha two) at an input steering angle of FIG. 6 is indicated by curve (b) in FIG. 5. In FIG. 4, $\alpha$ (alpha) denotes the slip angle with both vehicle steering and tread change. Transition of the slip angle $\alpha$ (alpha) at an input steering angle of FIG. 6 is indicated by curve (c) in FIG. 5, which is the sum of curve (a) and curve (b).

Requirement for guide link construction: For displacing a ground contacting point of the turned outer side wheel to the outside of the vehicle body, the wheel must be put inwardly in its upper arm area in which an upper guide link is mounted or outwardly in its lower area in which a lower guide link is mounted. Consequently, to change from a positive camber to a negative chamber on the turned outer side wheel to thereby displace the ground contacting point of the wheel to the outside of the vehicle body, two axle side mounting points of each guide link should be appropriately located as shown in plan view. As disclosed in U.S. Pat. No. 4,440,420, when a wheel center is located between the two axle side mounting points in the driving direction, guide link input forces due to external forces can be reduced more than when the axle side mounting points are biased from the wheel center. Further, the camber rigidity during vehicle steering can be increased by disposing the two guide links so as to be nonparallel when viewed in plan. Specifically, the best arrangement of the rear guide link is to dispose it approximately perpendicularly to the wheel during maximum vehicle steering. Furthermore, if a coupler disposed between the two axle side mounting points is lengthened inside the limit that it does not coincide with a guide link axis during maximum vehicle steering as viewed in plan view, a suspension system can be realized without decreasing the maximum steering angle.

In consideration of the above-mentioned points, the suspension system of the present invention is constructed to positively produce a thread change during vehicle steering.

FIG. 1 shows a first embodiment of a suspension system according to the present invention, in which a coupler 2 of a dirigible wheel 1 is connected to a vehicle body 3 through a front upper guide link 11 and a rear upper guide link 12 in the upper area and through lower guide links 20 in the lower area and is also connected to a side rod 30 of a steering system. The front upper guide link 11 is to disposed that its vehicle side mounting point $B_{FU}$ is located forwardly of its axle side mounting point $A_{FU}$ in the driving direction while the rear upper guide link 12 is disposed so that its vehicle side mounting point $B_{RU}$ is located rearwardly of its axle side mounting point $A_{RU}$ in the driving direction. Additionally, as viewed in plan view, a wheel center C is located forwardly of a middle position $A_C$ between the axle side mounting points $A_{FU}$, $A_{RU}$ of the two guide links 11, 12 in the driving direction and rearwardly of the axle side mounting point $A_{FU}$ of the guide link 11.

Figure 7:
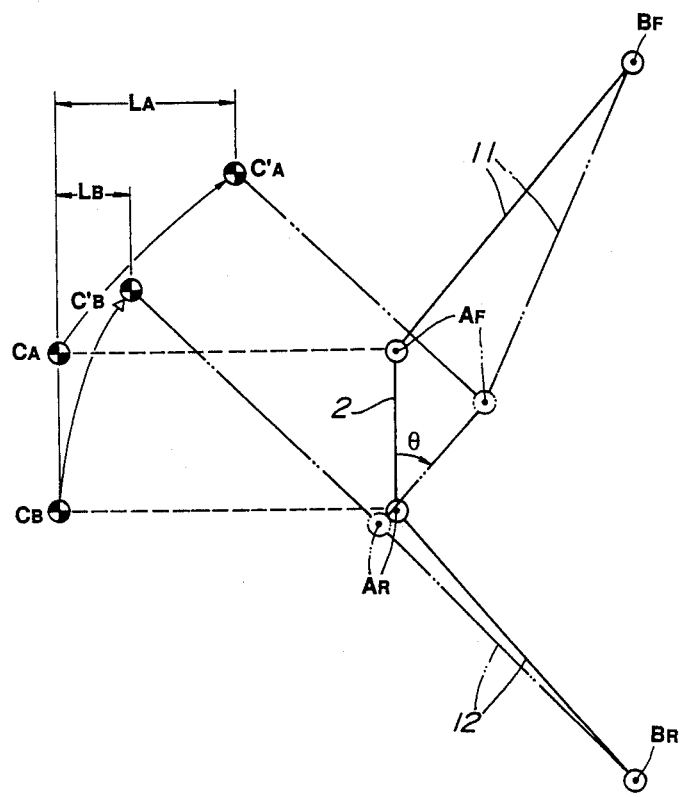
FIG. 7 is a diagram showing the displacement in the widthwise direction of the vehicle relative to the steering angle in the first embodiment.

In connection with the positions of the axle side mounting points $A_{FU}$, $A_{RU}$ of the upper guide links 11, 12, displacement in the widthwise direction of the vehicle relative to the same steering angle $\theta$ varies with the position of the wheel center C. In FIG. 7, as viewed in plan view, if the center is located at a point $C_A$, the displacement is $l_A$, while if it is located at a point $C_B$, the displacement is $l_B$. That is, a camber angle change and the tread change during vehicle steering become greater as the center of tire C is nearer to point $C_A$.

In this embodiment, the lower guide links 20 are arranged be nonparallel, and the middle position between the axle side mounting points $A_{FL}$, $A_{RL}$ coincides with the wheel center C. However, it is understood that lower guide links are not limited thereto and conventional control arms may be used.

Figure 8:
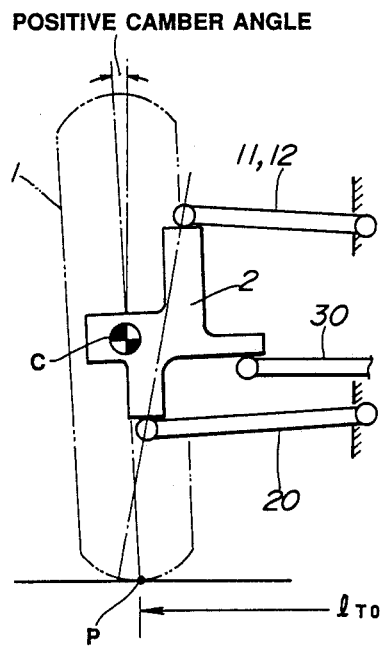
FIG. 8 is an elevation of the suspension system of the first embodiment in a straight driving position as viewed from the rear of the vehicle.
Figure 9:
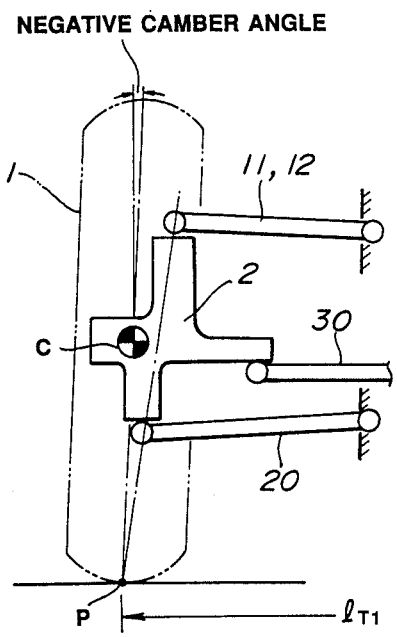
FIG. 9 is a rear elevation of the suspension system of the first embodiment in a turning position as viewed from the rear of the vehicle.

During vehicle turning, the upper area of the wheel on the outer side of the turn is controlled by the upper guide link system and put inwardly relative to the lower area of the wheel which is controlled by the lower guide link system. As a result, the camber changes from a positive camber in a vehicle straight driving position as shown in FIG. 8 to a negative camber in a vehicle turning position as shown in FIG. 9 and the ground contacting point of the wheel P is transversely displaced to the outside of the vehicle, thereby increasing the tread change $l_T$ from $l_{T0}$ to $L_{T1}$ ($>l_{T0}$). Accordingly, as mentioned above, during vehicle turning at a low or medium speed, the equivalent toe angle is increased by the tread change so that responsiveness of the dirigible wheel 1 for a handle operation is increased, while during vehicle turning at a high speed, the angle is decreased by the tread change so that the responsiveness is decreased.

Figure 10:
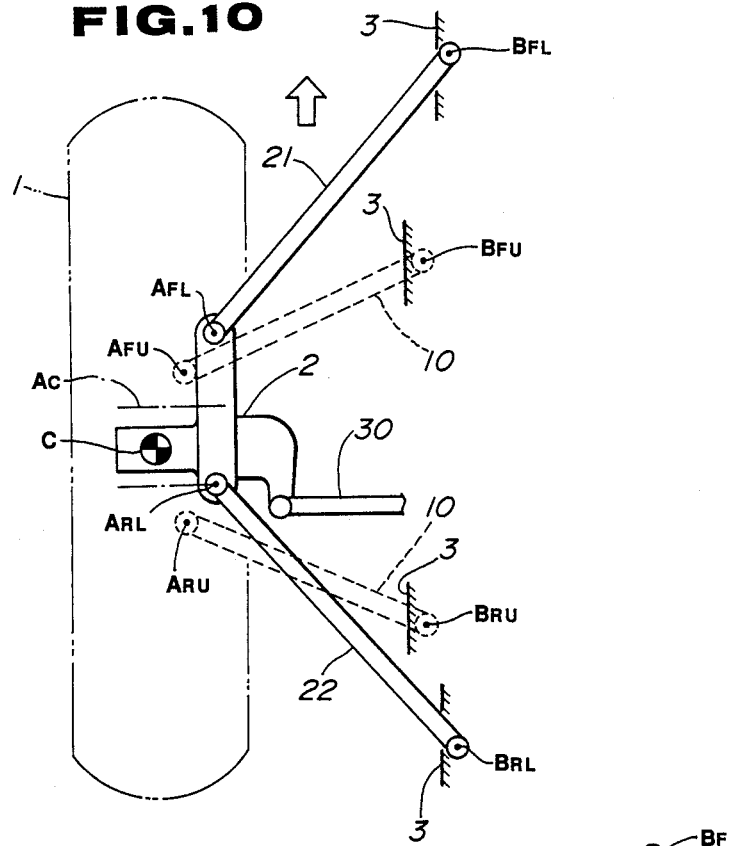
FIG. 10 is a plan view of a suspension system for a dirigible wheel of a motor vehicles according to a second embodiment of the present invention.

FIG. 10 shows a second embodiment of a suspension system according to the present invention, in which a coupler 2 of a dirigible wheel 1 is connected to a vehicle body 3 through upper guide links 10 in the upper area and through a front lower guide link 21 and a rear lower guide link 22 in the lower area and is also connected to a side rod 30 of a steering system. The front lower guide link 21 is so disposed that its vehicle side mounting point $B_{FL}$ is located forwardly of its axle side mounting point $A_{FL}$ in the driving direction while the rear upper guide link 22 is so disposed that its vehicle side mounting point $B_{RL}$ is located rearwardly to its axle side mounting point $A_{RL}$ in the driving direction. Additionally, as viewed in plan view, the wheel center C is located rearwardly of a middle position $A_C$ between the axle side mounting points $A_{FL}$, $A_{RL}$ of the two guide links 21, 22 in the driving direction and forwardly of the axle side mounting point $A_{RL}$ of the guide link 21.

In this embodiment, the upper guide links 10 are arranged to be nonparallel, and the middle position between the axle side mounting points $A_{FU}$, $A_{RU}$ coincides with the wheel center C. However, it is understood that guide links are not limited thereto and conventional control arms may be used.

During vehicle turning, the lower area of the wheel on the outer side of the turn is controlled by the lower guide link system is put outwardly relative to the upper area of the wheel, which is controlled by the upper guide link system. As a result, in a similar manner to the first embodiment, the camber changes positive to negative and the ground contacting point of the wheel P is transversely displaced to the outside of the vehicle, thereby increasing the tread change $l_T$.

Figure 11:
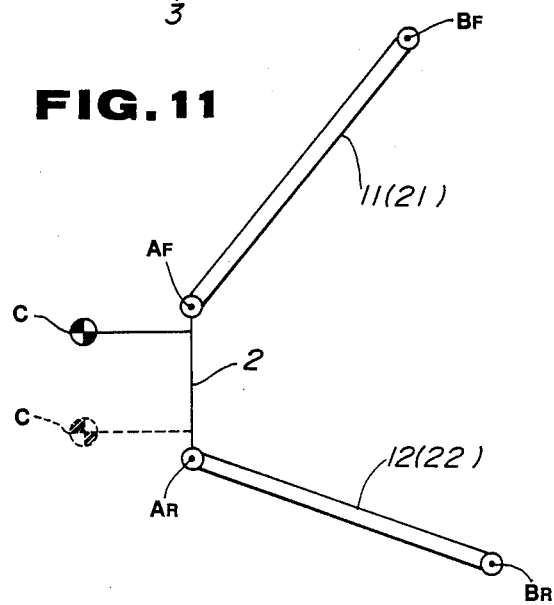
FIG. 11 is a diagram showing an example of a guide link construction in which front and rear guide links are different in length.

Having described the present invention as related to the embodiments shown in the accompanying drawings, it is to be understood that the embodiments are illustrative and not restrictive. If the tread change is to be large, for example, a combination of an upper guide link construction of the first embodiment and a lower guide link construction of the second embodiment may be used. Additionally, the front and rear guide links may be different in length as shown in FIG. 11.

What is claimed is:

1. A suspension system for a dirigible wheel of a motor vehicle having a vehicle body with a longitudinal axis and a dirigible wheel with a center, comprising:
   a wheel carrier with an axle rotatably supporting the dirigible wheel, said wheel carrier having a lower portion and an upper portion;
   first means for connecting said lower portion of said wheel carrier with the vehicle body; and
   second means for connecting said upper portion of said wheel carrier with the vehicle body, said second means having a first axle side mounting portion and a second axle side mounting portion mounted on said upper portion of said wheel carrier, said first and second axle side mounting portions of said second means being disposed on opposite sides of the wheel center in the longitudinal direction of the vehicle body with a middle portion which is substantially equidistant from said axle side mounting portions being displaced from the center of the wheel in the longitudinal direction of the vehicle body.

2. A suspension system as claimed in claim 1 wherein the center of the dirigible wheel is displaced forwardly of said middle portion in the longitudinal direction of the vehicle body.

3. A suspension system as claimed in claim 1 wherein the center of the dirigible wheel is displaced rearwardly of said middle portion in the longitudinal direction of the vehicle body of said middle portion with respect to the longitudinal axis.

4. A suspension system for a dirigible wheel of a motor vehicle having a vehicle body with a longitudinal axis and a dirigible wheel with a center, comprising:
   a wheel carrier with an axle rotatably supporting the dirigible wheel, said wheel carrier having a lower portion and an upper portion;
   first means for connecting said lower portion of said wheel carrier to the vehicle body; and
   second means for connecting said upper portion of said wheel carrier to the vehicle body, said second means having a first axle side mounting portion and a second axle side mounting portion mounted on said upper portion of said wheel carrier, said first and second axle side mounting portions being spaced from one another in the longitudinal direction of the vehicle body on opposite sides of the center of the dirigible wheel and having a middle portion which is substantially equidistant from said first and second axle side mounting portions and which is displaced from the center of the dirigible wheel in the longitudinal direction of the vehicle body, said second means having a first vehicle side mounting portion and a second vehicle side mounting portion mounted on the vehicle body, said first vehicle side mounting portion being located forwardly of said first axle side mounting portion and said second vehicle side mounting portion being located rearwardly of said second axle side mounting portion.

5. A suspension system for a dirigible wheel of a motor vehicle having a vehicle body with a longitudinal axis and a dirigible wheel with a center, comprising:
   a wheel carrier with an axle rotatably supporting the dirigible wheel, said wheel carrier having a lower portion and an upper portion;
   two lower links for connecting said lower portion of said wheel carrier with the vehicle body; and
   two upper links for connecting said upper portion of said wheel carrier with the vehicle body, said upper links having a first axle side mounting portion and a second axle side mounting portion mounted on said upper portion, said first and second axle side mounting portion of said upper links being disposed on opposite sides of the center of the dirigible wheel in the longitudinal direction of the vehicle body and having a middle portion which is substantially equidistant from said first and second axle side mounting portion and which is displaced from the center of the dirigible wheel in the longitudinal direction of the vehicle body.

* * * * *